United States Patent
Muto et al.

(10) Patent No.: US 6,644,104 B2
(45) Date of Patent: Nov. 11, 2003

(54) INTAKE AIR-FLOW RATE DETECTING APPARATUS AND DETECTING METHOD OF INTERNAL COMBUSTION ENGINE

(75) Inventors: Harufumi Muto, Nishikamo-gun (JP); Daisuke Kobayashi, Toyota (JP); Satoshi Furukawa, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 09/925,322

(22) Filed: Aug. 10, 2001

(65) Prior Publication Data

US 2002/0035868 A1 Mar. 28, 2002

(30) Foreign Application Priority Data

Sep. 22, 2000 (JP) ........................................ 2000-288786

(51) Int. Cl.[7] ............................................. G01M 15/00
(52) U.S. Cl. ..................................... 73/118.2; 73/118.2
(58) Field of Search ............................. 73/118.2, 117.3, 73/116, 204.18; 123/417, 421, 478, 480, 488, 494, 491, 647

(56) References Cited

U.S. PATENT DOCUMENTS 5,086,745 A * 2/1992 Nishimura et al. ......... 123/494
5,107,812 A * 4/1992 Takamoto et al. .......... 123/417

FOREIGN PATENT DOCUMENTS

| JP | A 2-42160 | 2/1990 |
| JP | A 5-248908 | 9/1993 |
| JP | A 8-62012 | 3/1996 |

* cited by examiner

Primary Examiner—Kamand Cuneo
Assistant Examiner—Monica D. Harrison
(74) Attorney, Agent, or Firm—Oliff & Berridge, PLC

(57) ABSTRACT

An intake air-flow rate detecting apparatus of an internal combustion engine according to the present invention has a thermal air-flow sensor for detecting an intake air-flow rate of the internal combustion engine, and a response lag compensator for compensating for a response lag of the air-flow sensor, using a first-order lag element concerning a heat release amount in the air-flow sensor. Since the response lag process is carried out on the dimension of the heat release amount, the response lag of the air-flow sensor can be compensated for with accuracy and the response lag of the thermal air-flow sensor can be compensated for with high accuracy.

11 Claims, 6 Drawing Sheets

INTAKE AIR-FLOW RATE DETECTING APPARATUS AND DETECTING METHOD OF INTERNAL COMBUSTION ENGINE

BACKGROUND OF THE INVENTION

1. Field of the Invention

The present invention relates to an intake air-flow rate detecting apparatus and detecting method of an internal combustion engine.

2. Related Background Art

In the internal combustion engines, the amount of air drawn thereinto (intake air-flow rate) is detected in order to obtain optimal output and implement effective purification of exhaust gas. Generally, there are two methods to detect the intake air-flow rate. One is a method of indirectly detecting the intake air-flow rate from a vacuum inside an intake pipe by making use of correlation between intake-pipe depression and intake air-flow rate. The vacuum is detected by a sensor. Another is a method of directly detecting the intake air-flow rate by an air-flow sensor. The present invention concerns the air-flow sensor using the latter method and, more particularly, a thermal air-flow sensor.

Output of the thermal air-flow sensor involves a response lag because of structural factors of the sensor. The response lag causes little influence as long as the internal combustion engine is operating in a steady state. While the internal combustion engine is in a transient state, however, the response lag should be compensated for. A well-known system for compensating for the response lag is the one described in Japanese Patent Application Laid-Open No. H08-62012. The system described in the above application is configured to perform a first-order lag process concerning the flow rate, for the output of the thermal air-flow sensor, and thereafter linearize it to obtain the intake air-flow rate.

SUMMARY OF THE INVENTION

The system described in the above application, however, sometimes failed to attain high accuracy and there were desires for further improvement to attain higher accuracy. An object of the present invention is thus to provide an intake air-flow rate detecting apparatus and detecting method of an internal combustion engine that can compensate for the response lag of the thermal air-flow sensor with high accuracy.

An intake air-flow rate detecting apparatus of an internal combustion engine according to the present invention is characterized by comprising a thermal air-flow sensor for detecting an intake air-flow rate of the internal combustion engine; and response lag compensating means for compensating for a response lag of the air-flow sensor, using a first-order lag element concerning a heat release amount in the air-flow sensor. According to the present invention, compensating process of the response lag is carried out on the dimension of the heat release amount, whereby response lag of the air-flow sensor can be compensated for with accuracy. Since the response lag in the air-flow sensor is caused mainly by the phenomenon of heat balance at a detector part, the compensating process on the dimension of heat release amount is fitter for the actual phenomenon and can improve the accuracy.

It is preferable herein that the response lag compensating means be configured to divide the air-flow sensor into a plurality of sections, take account of first-order lag elements concerning heat release amounts in the respective sections, and combine them, thereby compensating for the response lag of the whole of the air-flow sensor. The accuracy is enhanced by carrying out the compensating processes of the first-order response lags concerning the heat release amounts in the respective sections and combining them. Particularly, it is preferable that the detector part of said air-flow sensor be divided into a bobbin section, a lead wire, and a support section and that first-order response lags of the respective sections be taken into account.

Further, it is preferable that said response lag compensating means determine each of time constants of first-order lag models for the respective sections, based on the intake air-flow rate (the word "air-flow rate" includes the meanings of "flow rate" and "flow amount" in this application) detected by said air-flow sensor. For compensating for the response lag, the compensation is made as first-order lag behavior concerning the heat release amounts and the time constants of such first-order lag systems are determined based on the flow amount or the flow rate, whereby the accuracy can be enhanced further more. Particularly, it is preferable that the time constants be determined based on a flow amount per unit cross section of an intake passage on which the air-flow sensor is disposed. When the time constants are determined based on the flow amount per unit cross section, there is no need for execution of experiment for matching among internal combustion engines with different cross sections of the intake passage. And also a map of relation between the output voltage of the air-flow sensor and the time constant can be mounted on the apparatus.

An intake air-flow rate detecting method of an internal combustion engine according to the present invention is a method wherein, using a first-order lag element concerning a heat release amount in a thermal air-flow sensor for detecting an intake air-flow rate of the internal combustion engine, a response lag of said air-flow sensor is compensated for. According to the present invention, the compensating process of the response lag is carried out on the dimension of the heat release amount, whereby the response lag of the air-flow sensor can be compensated for with accuracy. Since the response lag in the air-flow sensor is caused mainly by the phenomenon of heat balance at the detector part, the process on the dimension of heat release amount is fitter for the actual phenomenon and can improve the accuracy.

It is preferable here that the response lag of the whole of said air-flow sensor be compensated for by dividing said air-flow sensor into a plurality of sections, taking account of first-order lag elements concerning heat release amounts in the respective sections, and combining the first-order lag elements of the respective sections. The accuracy is enhanced by carrying out the compensating processes of the first-order response lags concerning the heat release amounts in the respective sections and combining them. Particularly, it is preferable that the detector part of said air-flow sensor be divided into a bobbin section, a lead wire, and a support section and that first-order response lags of the respective sections be taken into account.

Further, it is preferable that each of time constants of first-order lag models for the respective sections be determined based on a flow rate or a flow amount of the intake air-flow rate detected by said air-flow sensor. For compensating for the response lag, the compensation is made as the first-order lag behavior concerning the heat release amounts and the time constants of such first-order lag systems are determined based on the flow amount or the flow rate, whereby the accuracy can be enhanced further more.

Particularly, it is preferable that the time constants be determined based on a flow amount per unit cross section of an intake passage on which the air-flow sensor is disposed. When the time constants are determined based on the flow amount per unit cross section, there is no need for execution of experiment for matching among internal combustion engines with different cross sections of the intake passage. And also a map of relation between the output voltage of the air-flow sensor and the time constant can be mounted on the apparatus.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
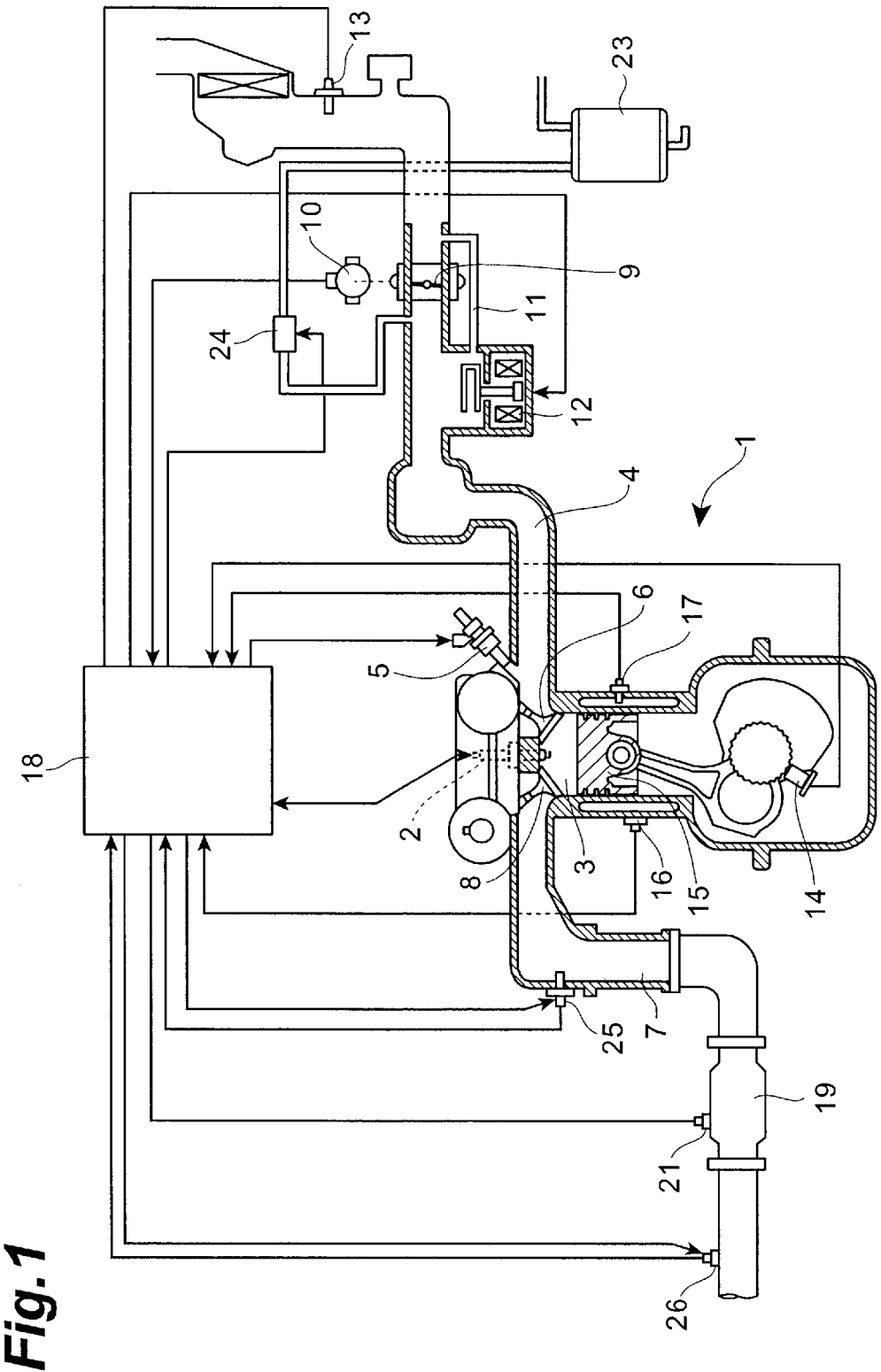
FIG. 1 is a cross-sectional view showing an internal combustion engine incorporating an embodiment of the detecting apparatus of the present invention.

Embodiments of the intake air-flow rate detecting apparatus and detecting method of the present invention will be described below. FIG. 1 shows an internal combustion engine incorporating an embodiment of the intake air-flow rate detecting apparatus.

The detecting apparatus and detecting method of the present embodiment are configured to detect the intake air-flow rate to engine 1 being an internal combustion engine. The engine 1 is a multi-cylinder engine. FIG. 1 shows a cross section of only one cylinder 3 out of cylinders. The engine 1 generates the driving force by igniting an air-fuel mixture in each cylinder 3 by an ignition plug 2. For implementing combustion in the engine 1, the air drawn from the outside passes through an intake path 4 and is mixed with fuel injected from injector 5 to be drawn as an air-fuel mixture into each cylinder 3. An intake valve 6 opens and closes between the interior of each cylinder 3 and the intake path 4. After burnt inside the cylinder 3, the mixture is purged as exhaust gas into an exhaust path 7. An exhaust valve 8 opens and closes between the interior of each cylinder 3 and the exhaust path 7.

A throttle valve 9 for controlling the intake air-flow rate drawn into the cylinders 3 is disposed on the exhaust path 4. Connected to this throttle valve 9 is a throttle position sensor 10 for detecting an opening level of the throttle valve 9 (i.e., a throttle angle TA). On the intake path 4 there is also provided an air bypass valve 12 for controlling the intake air-flow rate supplied to the cylinders 3 through a bypass line 11 during idling (in a fully closed state of the throttle valve 9). Further, an air-flow sensor 13 for detecting the intake air-flow rate is mounted on the intake path 4.

This air-flow sensor 13 is of a so-called hot wire type (thermal type). The air-flow sensor 13 of the present embodiment is of a so-called divided flow (bypass) measuring type in which part of intake air is guided as a bypass stream through a detector part and in which the detector directly measures a mass flow. An enlarged view of the air-flow sensor 13 is presented in FIG. 2A and an enlarged perspective view of the detector part in FIG. 2B. It is noted that the present invention can not be applied only to the air-flow sensors of the bypass measuring type but can also be applied to the air-flow sensors of a main stream measuring type. With the air-flow sensors of the main stream measuring type, a hot wire is located approximately in the center of the intake path.

Figure 2A:
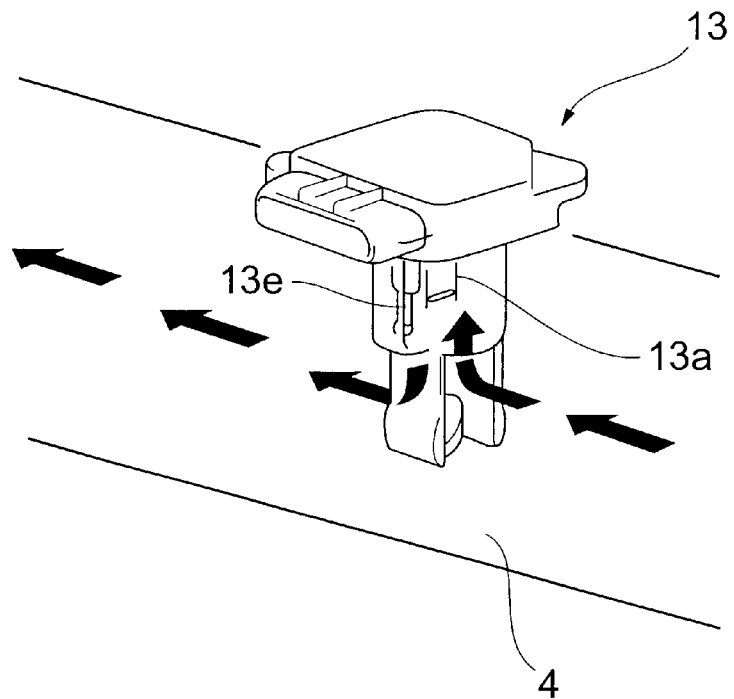
FIG. 2A is a perspective view showing an air-flow sensor in an embodiment of the detecting apparatus of the present invention.
Figure 2B:
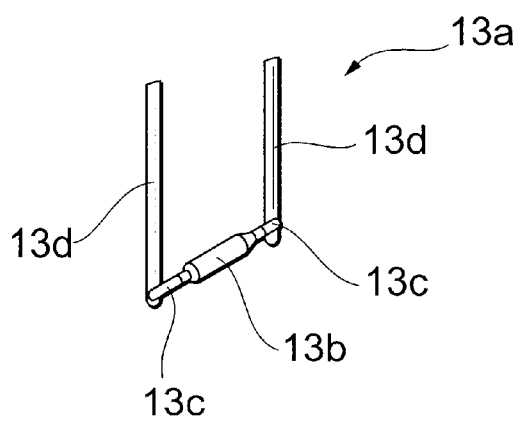
FIG. 2B is an enlarged, perspective view of a detector part of the air-flow sensor shown in FIG. 2A.

Arrows in FIG. 2A show the flow of the bypass stream. The bypass stream runs near the detector part 13a of the air-flow sensor 13. As shown in FIG. 2B, the detector part 13a consists of a bobbin portion 13b, lead wires 13c, and support portions 13d. The air-flow sensor 13 of the present embodiment has an intake-air temperature detecting section 13e of a thermistor type and thus can also detect the temperature of intake air. Since the air-flow sensor 13 directly measures the mass flow, it does not require correction for density against intake temperature. However, the intake temperature is necessary for control of the engine 1 and thus is detected herein.

A crank position sensor 14 for detecting the position of the crank shaft is mounted near the crank shaft of the engine 1. It is also possible to obtain positions of pistons 15 in the cylinders 3 and the engine speed NE from output of the crank position sensor 14. The engine 1 is also provided with a knock sensor 16 for detecting knocking of the engine 1 and a water temperature sensor 17 for detecting the temperature of cooling water (coolant).

An exhaust purifying catalyst 19 is placed on the exhaust path 7. There are also cases wherein a plurality of exhaust purifying catalysts are disposed upstream and downstream on the exhaust path. For the multi-cylinder engines and the like, there are also cases wherein a plurality of exhaust purifying catalysts are disposed in parallel upstream of a junction of exhaust pipes from the respective cylinders. In the present embodiment, one exhaust purifying catalyst 19 is disposed downstream of the junction of exhaust pipes from the respective cylinders 3.

The foregoing ignition plugs 2, injectors 5, throttle position sensor 10, air bypass valve 12, air-flow sensor 13, crank position sensor 14, knock sensor 16, water temperature sensor 17, and other sensors are connected to an electronic control unit (ECU) 18 for totally controlling the engine 1. They are controlled based on signals from the ECU 18 or send their detection results to the ECU 18. Also connected to the ECU 18 are a catalyst temperature sensor 21 for measuring the temperature of the exhaust purifying catalyst 19 disposed on the exhaust path 7, and a purge control valve 24 for purging evaporative fuel in an fuel tank, collected by a charcoal canister 23, onto the intake path 4.

Also connected to the ECU 18 are an upstream air-fuel ratio sensor 25 mounted upstream of the exhaust purifying catalyst 19 and a downstream air-fuel ratio sensor 26 mounted downstream of the exhaust purifying catalyst 19. Since these air-fuel ratio sensors 25, 26 cannot detect the air-fuel ratio accurately at temperatures below an activation temperature, they are heated by power supplied from the ECU 18 to raise their temperature to the activation temperature as early as possible.

The ECU 18 incorporates a CPU for performing arithmetic, an RAM for storing various information contents including arithmetic results and the like, a backup RAM storage contents of which are retained by a battery, ROMs storing respective control programs, and so on. The ECU 18 also performs compensation for the response lag of the air-flow sensor 13 and thus also functions as response lag compensating means.

Described below is control of compensating for the response lag of the air-flow sensor 13 by the above-stated apparatus.

First presented is the brief description of the response lag of the air-flow sensor 13.

As described previously, while the engine 1 is operating in the steady state, values of the intake air-flow rate are also almost constant and thus the response lag rarely poses a problem. However, while the engine 1 is operating in the transient state, the output of the air-flow sensor 13 lags behind the true intake air-flow rate. In order to obtain the accurate intake air-flow rate even in this transient state, the intake air-flow rate is estimated using the throttle angle TA and the engine speed NE (and valve timing VT if necessary).

In this case, however, if there is deviation of response speed between the intake air-flow rate estimated from TA, NE and the intake air-flow rate detected by the air-flow sensor 13, accurate control cannot be executed. It is then necessary to compensate for the response lag of the air-flow sensor 13. There are two conceivable approaches to compensating for the response lag of the air-flow sensor 13. The first approach is a method of adding the response lag of the air-flow sensor 13 to the intake air-flow rate without response lag estimated from the throttle angle TA and the engine speed NE to match the estimation with the intake air-flow rate with response lag detected by the air-flow sensor 13. The second approach is a method opposite to the first approach, which is a method of eliminating the response lag of the air-flow sensor 13 from the intake air-flow rate with response lag detected by the air-flow sensor 13 to match the detection with the intake air-flow rate without response lag estimated from the throttle angle TA and the engine speed NE.

First provided is the brief description of the method in which the intake air-flow rate without response lag estimated from the throttle angle TA and the engine speed NE is subjected to a "retarding process" corresponding to the response lag of the air-flow sensor 13, so as to be matched with the intake air-flow rate with response lag detected by the air-flow sensor 13. The response lag of the air-flow sensor 13 is handled as a mathematical model herein and the response lag is compensated for in consideration of the first-order lag. The method stated herein will be referred to as a "forward model" just for convenience' sake.

In contrast with it, a "backward model" denotes the method in which the intake air-flow rate with response lag detected by the air-flow sensor 13 is subjected to an "advancing process" corresponding to the response lag of the air-flow sensor 13, so as to be matched with the intake air-flow rate without response lag estimated from the throttle angle TA and the engine speed NE. The response lag of the air-flow sensor 13 can be compensated for by using either of the forward model and the backward model.

Figure 3:
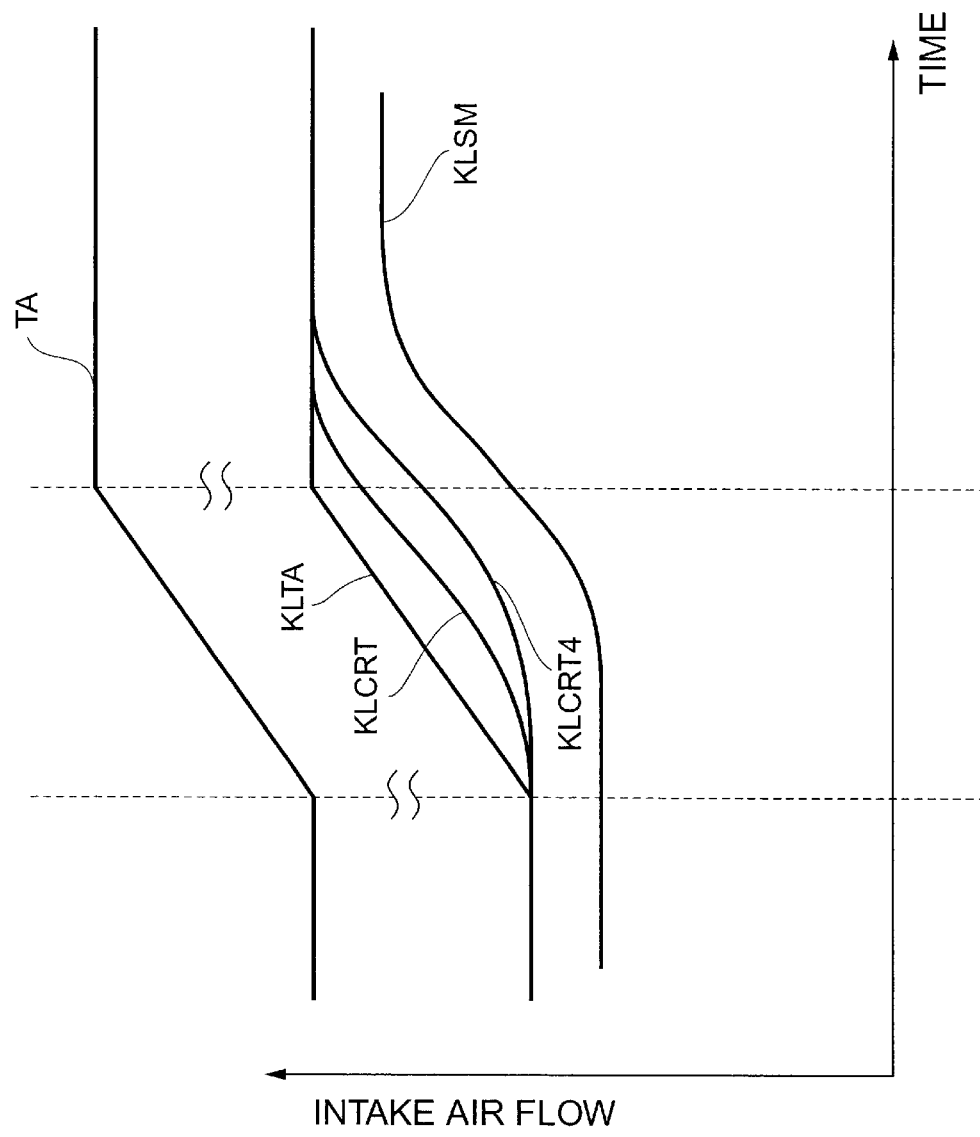
FIG. 3 is a graph showing the relationship between throttle angle TA and various calculated values of the intake air-flow rate.

FIG. 3 shows the relationship between the throttle angle TA and various intake air-flow rates calculated with use of the forward model. First described is a process of making a signal equivalent to the output of the air-flow sensor 13, from the throttle angle TA and others. The actual intake air-flow rate does not react immediately against change of the throttle angle TA, but the change of the actual intake air-flow rate behaves with a lag behind the change of the throttle angle TA. It is commonly known that this behavior exhibits behavior of a first-order lag system, and this example also makes use of this property. First, KLTA is determined based on the throttle angle TA and the engine speed NE. KLTA is the intake air-flow rate without response lag. The valve timing VT is also taken into account if necessary, for example, in the case where the open/close timing of the intake/exhaust valves 6, 8 can be variably controlled. This KLTA is a value after correction for atmospheric pressure.

While the engine 1 is in steady operation, the intake air-flow rate at that time is determined by the throttle angle TA and the engine speed NE and thus KLTA can also be called the "intake air-flow rate in the steady state". Values before correction for atmospheric pressure are mapped against parameters of the throttle angle TA and the engine speed NE, and a value obtained from the map is corrected by an atmospheric pressure to obtain KLTA. The atmospheric pressure is detected by an atmospheric pressure sensor installed near the air filter.

As described above, the actual intake air-flow rate behaves as a first-order lag system against the throttle angle TA. Then KLTA is subjected to a "first-order lag process", thereby calculating KLCRT, which is an estimate of the actual intake air-flow rate. Further, this KLCRT is processed using the foregoing forward model to calculate KLCRT4, which is an estimate of the output of the air-flow sensor 13 including the response lag. KLCRT4 is an equivalent of the output of the air-flow sensor 13, which is calculated from the throttle angle TA and the engine speed NE.

Namely, the actual intake air-flow rate (equivalent of KLCRT) behaves as a first-order lag system against change of the throttle angle TA. The output of the air-flow sensor 13 (equivalent of KLCRT4) lags more because of its structural factors and the like than this actual intake air-flow rate (equivalent of KLCRT). In this example, the foregoing forward model is used on the occasion of estimating the intake air-flow rate (KLCRT4) equivalent to the output of the air-flow sensor 13 from the actual intake air-flow rate (KLCRT) estimated. The forward model will be detailed later.

On the other hand, an intake air-flow rate KLSM smoothed so as to fit data processing is generated from the output of the air-flow sensor 13. Since KLSM is generated from the output of the air-flow sensor 13, it includes the response lag of the air-flow sensor 13. KLCRT4 and KLSM are matched as factors including the response lag. Here a value according to KLFWD=KLSM+(KLVLV−KLCRT4) described below is used as an intake air-flow rate of air drawn into the cylinders 3, in actual control of the engine 1.

Figure 4:
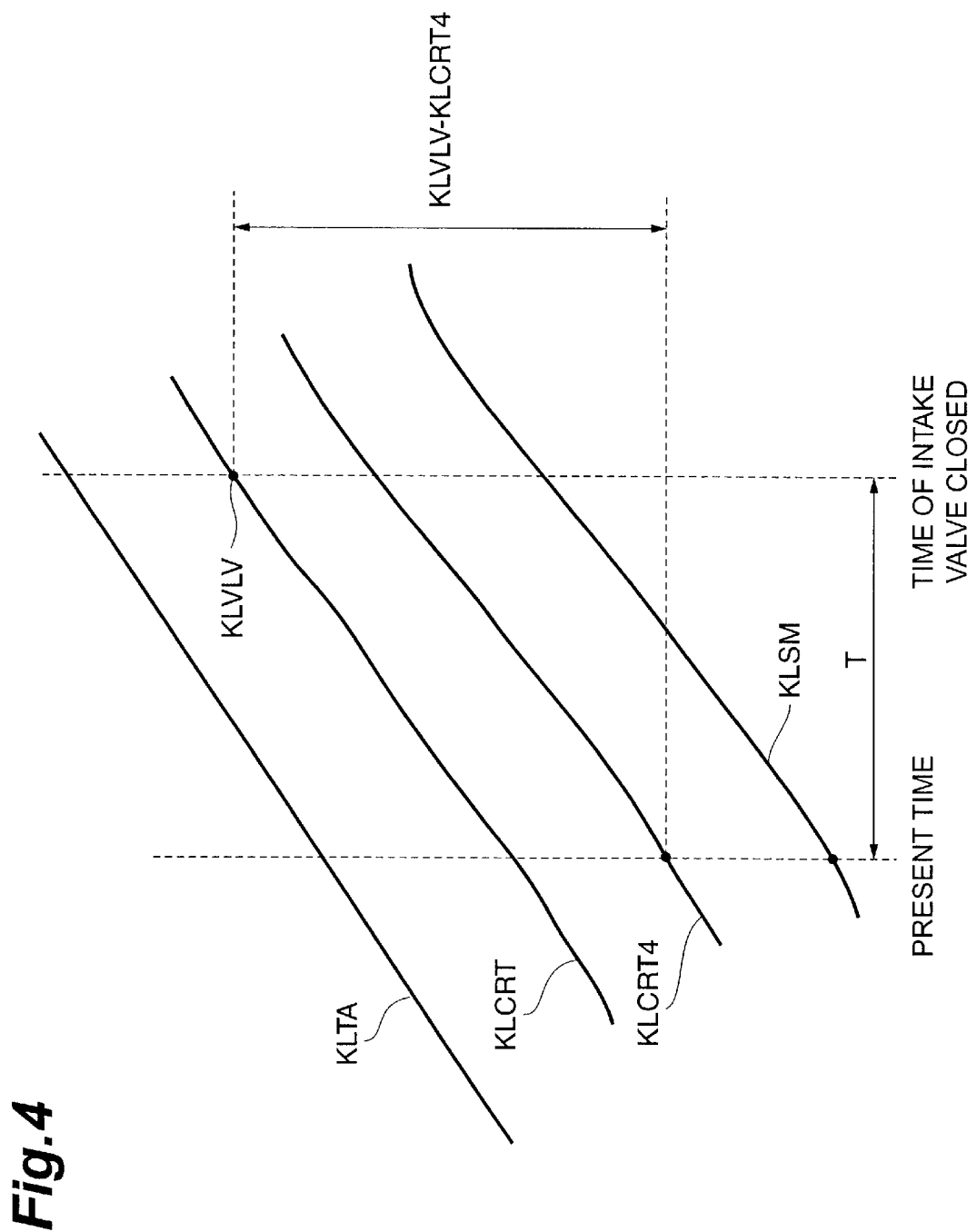
FIG. 4 is an enlarged graph of part of the graph of FIG. 3.

As shown FIG. 4, a difference (KLVLV−KLCRT4) is calculated between a value KLVLV and a current value of KLCRT4 with response lag. This KLVLV is a predicted value at a time T from a present time to a valve closing time, based on KLCRT without response lag. And the difference is added to current KLSM to obtain the intake air-flow rate KLFWD of air drawn into the cylinders 3. The value of this KLFWD includes no response lag.

If KLCRT4 and KLSM are perfectly coincident with each other, KLVLV can be used as a predicted value as it is, but there sometimes occurs parallel deviation between KLCRT4 and KLSM. A conceivable cause of the parallel deviation between KLCRT4 and KLSM is an error of bypass air-flow rate, for example. Thus this deviation is canceled out by adding (KLVLV−KLCRT4) to KLSM.

By executing the above-stated control, the intake air-flow rate can be gained with high accuracy, not only in the steady state but also in the transient state, and the control of the engine 1 can be implemented in the best condition, based thereon. The part of the forward model in the above-mentioned control will be described below in detail. In the present embodiment, the accuracy of the foregoing control is enhanced by use of this forward model.

In the foregoing forward model, KLCRT4 is generated as a value including the response lag from KLCRT without response lag, in consideration of the response lag property of the air-flow sensor 13. For processing the response lag of KLCRT4 against KLCRT herein, KLCRT4 is handled as a factor demonstrating the behavior of a first-order lag system concerning a heat release amount of the air-flow sensor 13, against KLCRT. Then the time constant of this first-order lag system is determined based on the intake air-flow rate (including a flow rate and a flow amount) at the air-flow sensor 13; in the present embodiment, specifically, it is determined based on a flow amount per unit area of a flow path.

In the present embodiment, the step of processing the response lag of KLCRT4 against KLCRT is not carried out on the dimension of the flow amount or flow rate. The process is configured to calculate the heat release amount from the intake air-flow rate, process the response lag on the dimension of the heat release amount, and linearize the result to the air-flow rate. This enhances the accuracy more. On the occasion of the calculation of the heat release amount, the air-flow sensor 13 is divided into a plurality of portions, an intake air-flow rate is calculated in consideration of a first-order lag model concerning a heat release amount in every divisional portion, and results are finally combined, thereby enhancing the accuracy more.

In the present embodiment, the air-flow sensor 13 is divided into the bobbin section 13b and the support section 13d. For the calculation herein, the lead wires 13c and support portions 13d are regarded as a single body (integral body) in the present embodiment. Although in the present embodiment the air-flow sensor 13 is handled substantially in the divided form into the bobbin section 13b and the support section 13d, the dividing method is not limited to this example but can be selected from various dividing methods of dividing the sensor into two, three, or more sections. For this division, it is preferable to divide the sensor in consideration of materials, heat release paths, and so on.

Figure 5:
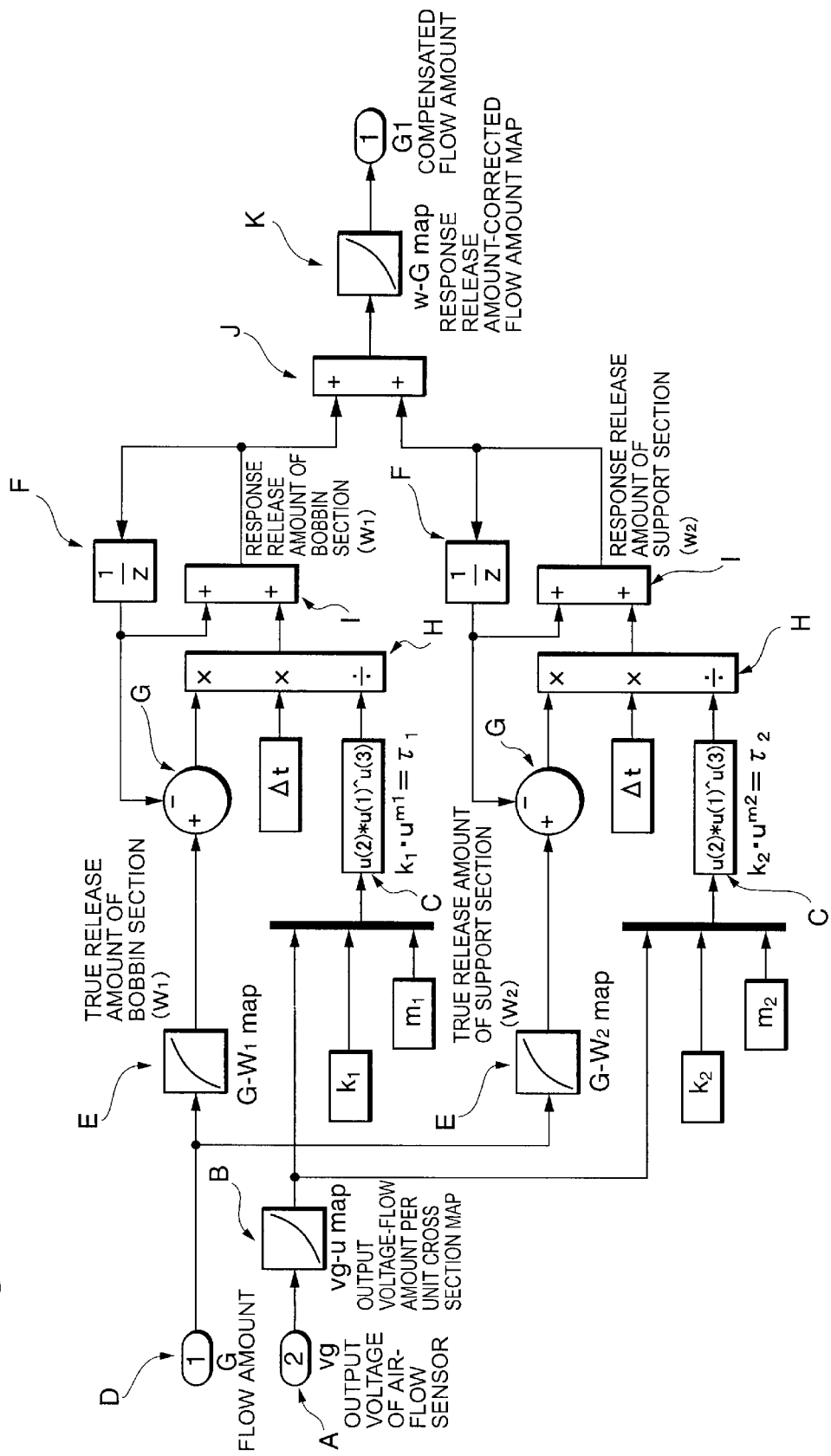
FIG. 5 is a chart (forward model) showing control by the detecting apparatus of the present invention.

A block diagram showing the control of the forward model is presented in FIG. 5. The chart shown in FIG. 5 is one prepared using SimulinkR which is a development tool available from MathWorks Inc., USA. The foregoing control of the forward model will be described together with how to read the chart. First described is the calculation of the time constant τ of the first-order lag system. In this example, the time constant τ is calculated by the following equation (I).

$$\tau = k \cdot u^m \quad (I)$$

Here "u" represents a flow amount of intake air per unit cross section of the flow path in the detector part of the air-flow sensor 13. If the detector part of the air-flow sensor 13 is in the bypass passage, the flow amount is given as a flow amount of intake air per unit cross section of the bypass passage. Further, k and m are constants preliminarily determined. For example, by experiment and they are determined for each of the bobbin section 13b and the support section 13d (including the lead wires 13c). Let $k_1$ and $m_2$ be the constants for the bobbin section 13b and $k_2$ and $m_2$ be the constants for the support section 13d. Further, let $\tau_1$ be the time constant of the bobbin section 13b and $\tau_2$ be the time constant of the support section 13d. Since degrees of response lag are different between the bobbin section 13b and the support section 13d, they are separated to set their respective time constants τ, thereby enhancing the accuracy.

Then the time constants τ of the respective sections are determined based on the intake air-flow rate detected by the air-flow sensor 13. The time constants τ indicate degrees of lag of first-order lag systems and are set herein based on the intake air-flow rate, thereby enhancing the accuracy. Particularly, the "intake air-flow rate" herein is the "flow amount." Further, the "flow amount" herein is a "flow amount per unit cross section of passage." On the left lower side of FIG. 5, it is indicated that the output voltage vg of the air-flow sensor 13 is set (at part A in FIG. 5). The output voltage vg indicating the intake air-flow rate is converted into the foregoing flow amount per unit cross section according to a vg-u map (at part B in FIG. 5).

The reason why the flow amount per unit cross section is used is that, by the air-flow sensor 13, the mass flow independent of the density can be obtained and it is thus easier to obtain the flow amount per unit cross section. Letting Q be the mass flow and S be the cross section of the passage, the flow amount per unit cross section is calculated by the following equation (II).

$$u = Q/S \quad (II)$$

Using this flow amount u per unit cross section, the respective time constants τ are calculated in the bobbin section 13b and the support section 13d (at parts C in FIG. 5). At each part C, calculation is conducted according to u(2)*u(1)^u(3), which indicates the values from the left as u(i), where i is numbered in order from above. Namely, describing this as to part C for the bobbin section 13b in FIG. 5, u(1) represents the flow amount u per unit cross section obtained from the vg-u map, u(2) the constant $k_1$, and u(3) the constant $m_1$. This also applies to the support section 13d. After all, the calculation here is done according to Eq (I) to calculate $\tau_1 = k_1 \cdot u^{m1}$ and $\tau_2 = k_2 \cdot u^{m2}$, which are the respective time constants of the bobbin section 13b and the support section 13d.

On the left upper side of FIG. 5 it is indicated on the other hand that the intake air-flow rate G calculated from the throttle angle TA and the engine speed NE (and the valve timing VT if necessary), equivalent to foregoing KLCRT, is set (at part D in FIG. 5). First, the intake air-flow rate G estimated as a value without response lag from the throttle angle TA and others is converted to respective true release amounts W of the bobbin section 13b and the support section 13d according to a map. The true release amounts W indicate amounts of heat release without response lag. In contrast with it, response release amounts w indicate amounts of heat release including the response lag, which are obtained by adding the effect of the response lag to the true release amounts W.

Let $W_1$ and $w_1$ be the true release amount and the response release amount of the bobbin section 13b, and $W_2$ and $w_2$ be the true release amount and the response release amount of the support section 13d. Used herein are a map indicating the relation between the intake air-flow rate G and the true release amount $W_1$ of the bobbin section 13b and a map indicating the relation between the intake air-flow rate G and the true release amount $W_2$ of the support section 13d. Since there is a difference between the heat release amount in the bobbin section 13b and the heat release amount in the support section 13d due to the intake air passing the detector portion of the air-flow sensor 13, they are allocated using the foregoing two maps (at parts E in FIG. 5).

Then the process of response lag based on the heat release amount is carried out in each of the bobbin section 13b and the support section 13d. The response lag is not processed on the dimension of the air-flow rate, but is processed on the dimension of the heat release amount calculated from the air-flow rate in this way, whereby the accuracy can be enhanced. Since the response lag in the air-flow sensor 13 is caused mainly by the phenomenon of heat balance at the detector part, the process on the dimension of the heat release amount is fitter for the actual phenomenon and can enhance the accuracy.

Then the effect of the first-order response lag is imparted to the true release amounts W obtained from the maps, to obtain the response release amounts w including the response lag. At this time, the response release amounts w are calculated from the following equation (III).

$$w_i = \Delta t \cdot (W_1 - w_{i-1})/\tau + w_{i-1} \qquad (III)$$

The subscript i represents current values and the subscript i−1 previous values. $\Delta t$ indicates a unit time of calculation, which is a period between the time of calculation of previous values and the time of calculation of current values.

"1/z" indicated at parts F in FIG. 5 means application of a previous value. Describing this about part G for the bobbin section 13b in FIG. 5, an operation is carried out using the current value $W_{1i}$ of the true release amount $W_1$ and the previous value $w_{1i-1}$ of the response release amount $w_1$ with their respective signs showing at part G. Namely, the operation of $W_{1i} - w_{1i}$ is carried out. Then part H in FIG. 5 indicates that the values from the left with their respective signs are subjected to an operation, specifically, that the operation of $(W_{1i} - w_{1i-1}) \cdot \Delta t/\tau_1$ is executed. Further, at part I in the figure, the values from the left with their respective signs are subjected to an operation to calculate $(W_{1i} - w_{1i-1}) \cdot \Delta t/\tau_1 + w_{1i-1}$. Namely, the aforementioned operation of Eq (III) is carried out in part F to part I in FIG. 5. The same also applies to the support section 13d.

The operation of Eq (III) is executed for each of the bobbin section 13b and the support section 13d, thereby completing the compensating process of the first-order response lag. Then the calculated response release amounts $w_{1i}$, $w_{2i}$ of the bobbin section 13b and the support section 13d are combined to synthesize the response release amount $w_1$ of the whole of the air-flow sensor 13. Specifically, the sum $w_{1i} + w_{2i}$ of the two release amounts is calculated at part J in FIG. 5, and then at part K in FIG. 5 the intake air-flow rate G1 including the response lag is obtained from a map indicating the relation between the sum $w_{1i} + w_{2i}$ and the intake air-flow rate G1. This is equivalent to KLCRT4 including the response lag calculated from the throttle angle TA and the engine speed NE.

As described above, the present embodiment is arranged to perform the response lag process on the dimension of heat release amount, thereby enhancing the accuracy of compensation for the response lag of the air-flow sensor 13. Further, since the heat release from the air-flow sensor 13 differs depending upon its portions, the present embodiment is arranged to divide the air-flow sensor 13 into plural sections, compensate for the response lag in each of the sections, and combine the results finally, thereby enhancing the accuracy of the compensation more.

In the present embodiment the response lag is compensated for, using the first-order lag behavior concerning the heat release amount, and the time constant $\tau$ of this first-order lag system is determined based on the air-flow rate (specifically, the flow amount per unit cross section herein), whereby the accuracy can be enhanced more. Namely, the accuracy of the foregoing calculation of KLCRT4 can be improved.

The above-stated embodiment was arranged to estimate the intake air-flow rate (equivalent to KLCRT4 of FIG. 3) equivalent to the intake air-flow rate detected by the air-flow sensor 13 (equivalent to KLSM of FIG. 3) from the intake air-flow rate calculated from the throttle angle TA and others (equivalent to KLCRT of FIG. 3), using the forward model. In the opposite way to it, it is also conceivable to estimate a signal (not shown in FIG. 3) equivalent to the intake air-flow rate calculated based on the throttle angle TA and others (equivalent to KLCRT of FIG. 3), from the intake air-flow rate detected by the air-flow sensor 13 (equivalent to KLSM of FIG. 3), using the backward model.

An example using this backward model will be described next. A block diagram in this case is presented in FIG. 6, which is a drawing corresponding to FIG. 5. On the left upper side in FIG. 6, it is indicated that the intake air-flow rate G2 obtained from the output of the air-flow sensor 13 is set (at part L in FIG. 6). This intake air-flow rate G2 includes the response lag, because it is obtained from the output of the air-flow sensor 13. The aforementioned response release amount $w_i$ is obtained from this intake air-flow rate G2, using a map (at part M in FIG. 6). This is a reverse process to the process at part K in FIG. 5 in the forward model. However, the response release amount $w_i$ obtained herein is just a combination of the response release amount $w_{1i}$ of the bobbin section 13b and the response release amount $w_{2i}$ of the support section 13d. It is then necessary to allocate the combined response release amount $w_i$ to the response release amount $w_{1i}$ of the bobbin section 13b and the response release amount $w_{2i}$ of the support section 13d.

Figure 6:
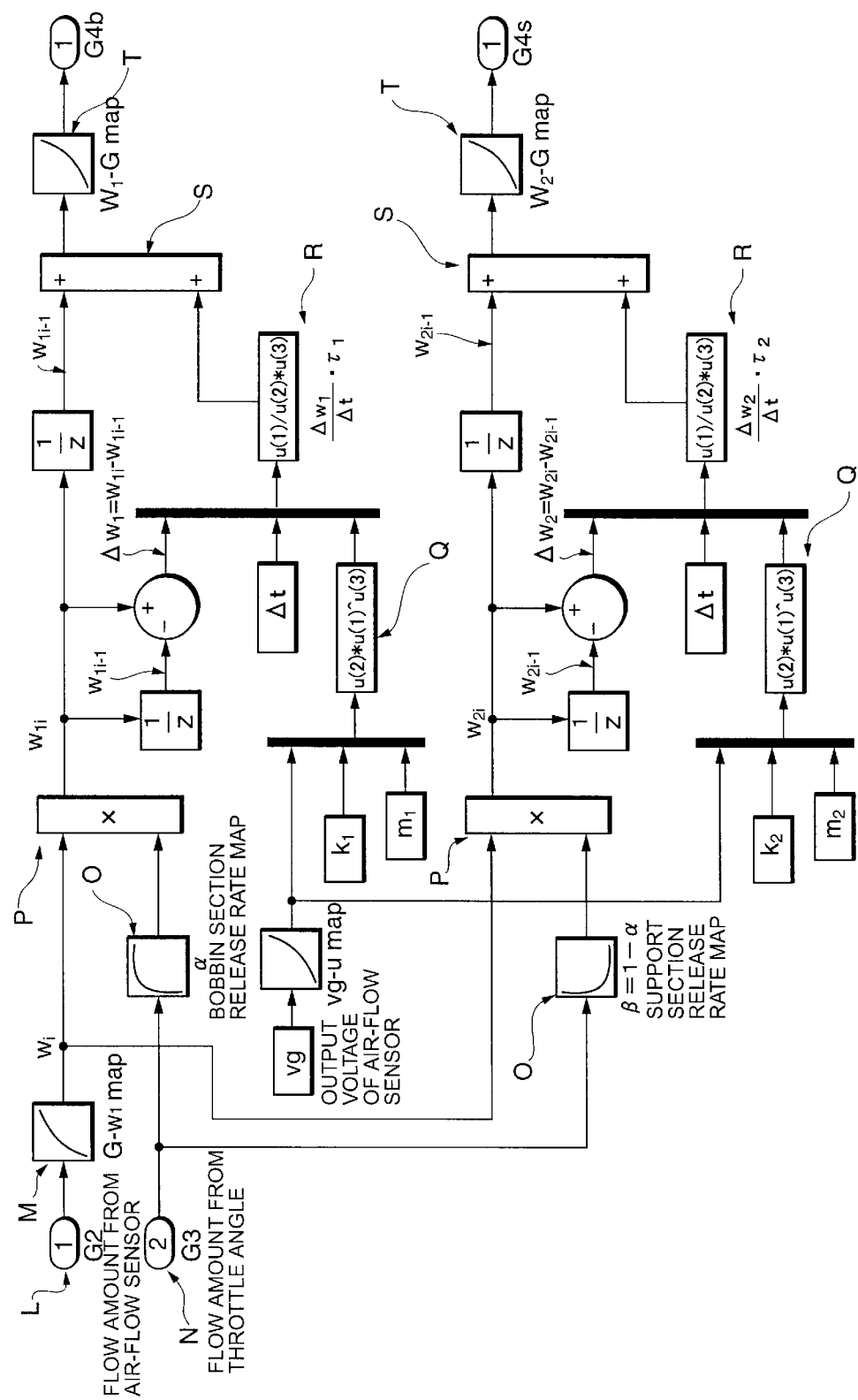
FIG. 6 is a chart (backward model) showing control by the detecting apparatus of the present invention.

On the left lower side of FIG. 6, it is indicated that the intake air-flow rate G3 calculated from the throttle angle TA (equivalent to KLCRT in FIG. 3) is set (at part N in FIG. 6) and allocation rates are determined based thereon, from maps (at parts O in FIG. 6). An allocation rate $\alpha$ for the bobbin section 13b and an allocation rate $\beta = (1-\alpha)$ for the support section 13d are determined from their respective maps. Based on this, the response release amount $w_{1i}$ of the bobbin section 13b is obtained as $w_{1i} = w_i \cdot \alpha$ (at part P in FIG. 6). The response release amount $w_{2i}$ of the support section 13d is also calculated similarly as $w_{2i} = w_i \cdot \beta = W_i \cdot (1-\alpha)$ (at part P in FIG. 6). If the allocation rates are different between in the steady state and in the transient state, the maps used herein are also prepared for the steady state and for the transient state.

At parts Q in FIG. 6, the respective time constants $\tau_1$, $\tau_2$ of the bobbin section 13b and for the support section 13d are calculated based on the output voltage of the air-flow sensor 13, as in the case of the forward model. Since this is substantially the same as in the forward model, the detailed description thereof is omitted herein.

The processing after this will be described for the bobbin section 13b side as an example. Let $\Delta w_1$ be a change amount of the response release amount $w_{1i}$ of the bobbin section 13b. Then $\tau w_1$ can be calculated according to the following equation (IV), as a difference between a current value $w_{1i}$ and a previous value $w_{1i-1}$ of the response release amount of the bobbin section 13b.

$$\Delta w_1 = w_{1i} - w_{1i-1} \quad (IV)$$

Namely, at part R in FIG. 6, calculation is done using the following equation (V).

$$\Delta w_1 / \Delta t \cdot \tau_1 \quad (V)$$

Then, at part S in FIG. 6, calculation is made according to the following equation (VI).

$$w_{1i-1} + \Delta w_1 / \Delta t \cdot \tau_1 \quad (VI)$$

By deforming Eq (III), which was explained in the forward model, and solving it about the true release amount $W_i$ herein, the following equation (VII) is derived.

$$W_i = w_{i-1} + (w_i - w_{i-1}) / \Delta t \cdot \tau \quad (VII)$$

By rewriting foregoing Eq (VI) by use of Eqs (IV) and (V), we obtain $w_{1i-1} + (w_{1i} - w_{1i-1})/\Delta t \cdot \tau$, which is equal to the right side of Eq (VII). Namely, the true release amount $W_{1i}$ on the bobbin section 13b side is calculated at part S in FIG. 6. The true release amount $W_{2i}$ is also calculated similarly for the support section 13d.

The intake air-flow rate G4 without response lag is obtained from the true release amount $W_{1i}$ on the bobbin section 13b side obtained in this way, using a map (at part T in FIG. 6) This is a reverse process to that at part E in FIG. 5 in the forward model. Namely, the intake air-flow rate G4b obtained from the map is an overall intake air-flow rate, but is not a share of the bobbin section 13b out of the overall intake air-flow rate. The processing is also carried out similarly for the support section 13d, to obtain the intake air-flow rate G4s. The intake air-flow rate G4b is the intake air-flow rate compensated in consideration of the heat release amount on the side of the bobbin section 13b and the intake air-flow rate G4s the intake air-flow rate compensated in consideration of the heat release amount on the side of the support section 13d. The two values are obtained in the backward model in this way.

Ideally, these two values must coincide with each other. In practice, however, they do not always coincide. Then the intake air-flow rate G4 after compensation is obtained finally by employing only either one of them or by calculating an average of them. The intake air-flow rate after compensation obtained using the backward model in this way can also be regarded as a value obtained by eliminating the component of response lag from the output of the air-flow sensor 13, and thus corresponds to the intake air-flow rate obtained from the throttle angle TA and others.

In the above-described embodiment, each of the time constants $\tau$ was calculated. However, since k and m are the constants preliminarily determined, the time constants $\tau$ are uniquely determined by the flow amount u per unit cross section. The flow amount u per unit cross section is also uniquely determined by the output voltage of the air-flow sensor 13. Namely, once the output voltage of the air-flow sensor 13 is determined, then each time constant $\tau$ is uniquely determined. Consequently, a map of relation between the output voltage of the air-flow sensor 13 and the time constant $\tau$ can be mounted on the apparatus. This eliminates the need for execution of experiment for matching among internal combustion engines with different cross sections of the intake passage and permits the map of relation between the output voltage of air-flow sensor 13 and the time constant $\tau$ to be mounted on the apparatus.

The present invention is by no means intended to be limited to the above-stated embodiments. For example, the time constants of first-order lag systems were determined based on the flow amount per unit cross section in the above embodiments, but they may be determined based on another flow amount different from that per unit cross section or may be determined according to the flow rate. As described previously, the dividing method of the air-flow sensor 13 is not limited to that in the above-stated embodiment.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An intake air-flow rate detecting apparatus of an internal combustion engine, comprising:
   a thermal air-flow sensor for detecting an intake air-flow rate of the internal combustion engine; and
   response lag compensating means for compensating for a response lag of said air-flow sensor, using a first-order lag element based on a heat release amount in said air-flow sensor, wherein an output of the air-flow sensor is not adjusted.

2. The intake air-flow rate detecting apparatus according to claim 1, wherein said response lag compensating means is configured to divide said air-flow sensor into a plurality of sections, calculate first-order lag elements based on the heat release amounts in the respective sections, and combine the first-order lag elements in the respective sections, thereby compensating for the response lag of the whole of said air-flow sensor.

3. The intake air-flow rate detecting apparatus according to claim 2, wherein said response lag compensating means determines each of time constants of first-order lag models for each of the respective sections, based on the intake air-flow rate detected by said air-flow sensor.

4. The intake air-flow rate detecting apparatus according to claim 3, wherein said time constants are determined based on a flow amount per unit cross section of an intake passage on which said air-flow sensor is disposed.

5. The intake air-flow rate detecting apparatus according to claim 2, wherein a detector part of said air-flow sensor is divided into a bobbin section, a lead wire, and a support section and first-order response lags of the respective sections are taken into account.

6. The intake air-flow rate detecting apparatus according to claim 5, wherein said air-flow sensor is an air-flow sensor of a bypass measuring type.

7. An intake air-flow rate detecting method of an internal combustion engine, comprising:
   calculating a first-order lag element based on a heat release amount in a thermal air-flow sensor for detecting an intake air-flow rate of the internal combustion engine to compensate for a response lag of said air-flow sensor, wherein an output of the air-flow sensor is not adjusted.

8. The intake air-flow rate detecting method according to claim 7, wherein the response lag of the whole of said air-flow sensor is compensated for by dividing said air-flow sensor into a plurality of sections, calculating first-order lag elements based on heat release amounts in the respective sections, and combining the first-order lag elements of the respective sections.

9. The intake air-flow rate detecting method according to claim 8, wherein each of time constants of first-order lag models for each of the respective sections is determined based on the intake air-flow rate detected by said air-flow sensor.

10. The intake air-flow rate detecting method according to claim 9, wherein said time constants are determined based on a flow amount per unit cross section of an intake passage on which said air-flow sensor is disposed.

11. The intake air-flow rate detecting method according to claim 8, wherein a detector part of said air-flow sensor is divided into a bobbin section, a lead wire, and a support section and first-order response lags of the respective sections are taken into account.

* * * * *